US010678537B1

(12) United States Patent
Hein et al.

(10) Patent No.: US 10,678,537 B1
(45) Date of Patent: Jun. 9, 2020

(54) METHOD AND SYSTEM FOR DOCUMENTING A CONTROL PROGRAM

(71) Applicant: dSPACE digital signal processing and control engineering GmbH, Paderborn (DE)

(72) Inventors: Renata Hein, Paderborn (DE); Fabian Mogge, Lippstadt (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 124 days.

(21) Appl. No.: 15/817,856

(22) Filed: Nov. 20, 2017

(51) Int. Cl.
*G06F 9/44* (2018.01)
*G06F 8/73* (2018.01)

(52) U.S. Cl.
CPC ..................... *G06F 8/73* (2013.01)

(58) Field of Classification Search
CPC ........................................................ G06F 8/73
USPC .......................................................... 717/123
See application file for complete search history.

(56) References Cited

U.S. PATENT DOCUMENTS

| 5,481,699 | A * | 1/1996 | Saether | G06F 11/1474 714/15 |
| 7,158,983 | B2 * | 1/2007 | Willse | G06F 16/345 |
| 7,805,510 | B2 * | 9/2010 | Bansal | H04L 67/22 709/224 |
| 7,849,392 | B2 * | 12/2010 | Rapp | G06Q 10/10 715/200 |
| 9,043,372 | B2 * | 5/2015 | Makkar | G06F 16/907 707/827 |
| 2005/0271275 | A1 * | 12/2005 | Chang | G06K 9/00456 382/176 |
| 2014/0101638 | A1 * | 4/2014 | Braun | G06F 8/73 717/123 |
| 2014/0344783 | A1 * | 11/2014 | Grechanik | G06F 8/70 717/123 |

OTHER PUBLICATIONS

H. Hanselmann et al., "Production Quality Code Generation from Simulink Block Diagrams", Proceedings of the 1999 IEEE International Symposium on Computer Aided Control System Design, Kohala-Coast, Hawai'i, USA (Aug. 22-27, 1999).

* cited by examiner

*Primary Examiner* — Evral E Bodden
(74) *Attorney, Agent, or Firm* — Muncy, Geissler, Olds & Lowe, P.C.

(57) ABSTRACT

A method for generating a documentation of a program, the program being generated from one or more blocks of a block diagram in a technical computing environment, the one or more blocks of the program having at least one hierarchical block whose functionality is defined by a plurality of blocks in a subordinate hierarchical level of the block diagram. The method is carried out by a computer system having at least one processor, the processor opening the block diagram at a top hierarchical level in a model editor of the technical computing environment and verifying if a documentation condition is fulfilled for the current hierarchical level of the block diagram. When the documentation condition is fulfilled, the processor generates documentation text for the blocks in the current hierarchical level.

20 Claims, 5 Drawing Sheets

METHOD AND SYSTEM FOR DOCUMENTING A CONTROL PROGRAM

BACKGROUND OF THE INVENTION

Field of the Invention

The present invention relates to methods and computer systems for automatically generating code from block diagrams, the code preferably being used in electronic control units.

Description of the Background Art

Electronic control units (abbreviated as ECUs) are ubiquitous especially in automotive applications; generally, they may contain a processor, in particular a microcontroller, one or more sensor interfaces and one or more circuits to control an actuator. Current parameters of a physical process are typically determined using the signals of the one or more sensors connected to the sensor interfaces. Based on a predefined control strategy, the processor may control the one or more circuits to apply the actuators in order to influence the physical process. In a particular example, an ECU may be used to perform anti-lock braking, with a sensor measuring the wheel velocity and a magnetic valve reducing the pressure in the corresponding wheel brakes.

In order to speed up the development process for ECUs, control strategies are typically developed using block diagrams in a technical computing environment (abbreviated as TCE), which allows for tracing the temporal behavior of a physical system described by one or more blocks in the block diagram. One particular example of a TCE is MATLAB/Simulink of The MathWorks.

The document "Production Quality Code Generation from Simulink Block Diagrams", Proceedings of the 1999 IEEE International Symposium on Computer Aided Control System Design, Kohala-Coast, Hawai'i, USA, by H. Hanselmann et al. describes a system for automatically generating production code based on a block diagram containing one or more blocks that specify the functionality of the program (Institute of Electrical and Electronics Engineers abbreviated as IEEE). The program may in particular be a control program for an ECU, the control program implementing the desired control strategy.

For using the generated production code, a suitable documentation is necessary. However, the information needed may depend on the skill level of the user and/or the intended use of the production code. While a high-level abstract description of the code may be useful for simply invoking the code from an external program, debugging or modifying the production code requires a more detailed documentation.

Thus, improved methods for generating a documentation, in particular a flexible and user-friendly customization of the documentation text, are desired.

SUMMARY OF THE INVENTION

It is therefore an object of the present invention to provide a method and computer system for automatically generating documentation for a program from a block diagram comprising a detailed implementation of the program.

In a first exemplary aspect of the invention, a computer-implemented method for generating a documentation of a program is provided, the program being generated from one or more blocks of a block diagram in a technical computing environment, the one or more blocks of the program comprising at least one hierarchical block whose functionality is defined by a plurality of blocks in a subordinate hierarchical level of the block diagram. The method is being carried out by a computer comprising at least one processor, the processor executing the steps of: opening the block diagram at a top hierarchical level in a model editor of the technical computing environment, verifying if a documentation condition is fulfilled for the current hierarchical level of the block diagram, when the documentation condition is fulfilled, generating documentation text for the blocks in the current hierarchical level, descending to a subordinate hierarchical level and verifying if the documentation condition is fulfilled for the subordinate hierarchical level, and generating documentation text for the blocks in the subordinate hierarchical level when the documentation condition is fulfilled.

The documentation condition comprises verifying that at least one documentation block is present in the current set of blocks and that at least one tag is defined in the documentation block.

The steps of the inventive methods may be carried out, for example, by a processor running different software components on a host computer, the software components preferably using the mechanisms of the technical computing environment or of the operating system of the host computer to exchange data and/or cause the execution of one or more further software components. The host computer may be realized as a single standard computer comprising a processor, in particular a high-speed general-purpose microprocessor, a display device and an input device. Alternatively, the host computer system may comprise one or more servers comprising one or more processing elements, the servers being connected to a client comprising a display device and an input device via a network.

Therefore, the technical computing environment may be executed partially or completely on a remote server, such as in a cloud computing setup. A graphical user interface of the technical computing environment may be displayed on a portable computing device, in particular a computing device with a touch screen interface. In this case, it is particularly advantageous when the computations for executing the block diagram are carried out on a remote server. The technical computing environment may comprise a graphical user interface for modifying the block diagram and a simulation engine for executing the block diagram, so that the dynamical system described by the block diagram can be simulated. The block diagram may comprise multiple blocks with input and/or output signals that are connected to output and/or input signals of other blocks. Each block may be an atomic functional unit or may be a hierarchical block that is composed of a plurality of subordinate blocks.

The current invention has the advantage that it is easy to use, because the blocks for documenting parts of the model are in close proximity of the corresponding blocks. The user can easily see to which function in the block diagram the settings in the current documentation block apply. Further, the customization of the documentation can be done by a user interface that corresponds to that for editing the model—which is well known to the user.

In an embodiment of the invention, a hierarchical level may contain multiple documentation blocks, wherein a first tag and a second tag may be defined, wherein a first documentation text is generated based on the at least one documentation block in which the first tag is defined and/or wherein a second documentation text is generated based on the at least one documentation block in which the second tag is defined. Each hierarchical level of the model may contain a plurality of documentation blocks. By adding a further documentation block and defining a new tag, a further version of the documentation can easily be generated by the user. It is useful that the text for a particular version of the documentation is defined in the corresponding block: When a first documentation block defines a first tag and a second documentation block defines a second tag, the user may simply edit the text for a version by opening the corresponding documentation block.

In an embodiment of the invention, the text of a documentation block may be assigned multiple tags, so that this documentation text is present in multiple versions of the documentation. As an alternative or in combination, the processor may perform a simultaneous selection of multiple tags, i.e. accumulating the documentation text for multiple predefined tags. This simplifies specifying parts of the documentation that are valid for multiple tags.

The block diagram can have a plurality of subordinate hierarchical levels, and the steps of descending to a subordinate hierarchical level, verifying if the documentation condition is fulfilled and generating documentation text are repeated until all hierarchical levels in the diagram have been considered. Descending to a subordinate hierarchical level may also comprise returning to a superior hierarchical level in order to descend the hierarchy of a further hierarchical block present in that hierarchical level. The different hierarchical levels may be reflected in the documentation, for instance the processor may start a new section of the documentation text when the hierarchical level in the block diagram changes.

In an embodiment of the invention, the one or more blocks of the program can have at least one input and at least one output, and the block diagram comprises one or more additional blocks, which are connected to the model via corresponding outputs and inputs, wherein the one or more additional blocks, for example, describes the temporal behavior of a dynamical system to be controlled by the program, and wherein no text is generated for the one or more additional blocks. Those parts of the block diagram that do not form a part of the program are not documented.

The inventive method further comprises the step of simulating the block diagram in a simulation engine of the technical computing environment, logging or extracting the values of one or more of the variables of one or more blocks of the program, and including the determined values in the documentation. By documenting previous simulation results, debugging of the program may be simplified. This is particularly advantageous when the program is converted to fixed-point code.

In an embodiment of the invention, a filter script is invoked during or after generating the documentation, the filter script removing, replacing or adding text based on a predefined filter rule. The defined tags are in general not related to the filter script. However, the predefined filter rule may process documentation text differently based on the corresponding tag. The filter script may comprise checking if predefined conditions are fulfilled and/or accessing data sources, such as a data definition tool. The filter script may invoke one or more further scripts. Different filter scripts may be invoked at different steps in performing the inventive method; further invoking a filter script may, but need not, depend on an additional condition such as the presence of a documentation block with a predefined tag. In addition to adding or removing text, filter scripts may also be used to change the order of different sections in the text. A filter script can affect an intermediate version of the documentation text prior to exporting the documentation into one or more files, such as a portable document format (PDF) or a hyper-text markup language (HTML) document.

According to an embodiment of the invention, additional documentation text is generated for those hierarchical levels that comprise a block of a specific type. The block of a specific type may be a block present in the current hierarchical level, such as a function block for defining a function in the generated code; alternatively, the block of a specific type may be a special hierarchical block comprising the current hierarchical level. Additionally, the top hierarchical level may be assumed to always comprise a block of a specific type, so that a documentation for the top hierarchical levels may always be generated. In an embodiment of the invention, the documentation text for those hierarchical levels who comprise a block of a specific type is stored in a separate file, wherein the documentation for the program is assembled from multiple separate files, and wherein if a separate file for a particular hierarchical level is present, the content of the separate file is used in creating the documentation. In particular, the block of a specific type may be a block defining a function in the generated code. Preferably, documentation text from hierarchical levels addressed from the current hierarchical level with a second block is comprised in the file for the current hierarchical level. It is advantageous when the whole documentation text is comprised in the multiple separate files.

According to an embodiment of the invention, the documentation text for the particular hierarchical level is regenerated when an update condition is fulfilled, wherein the update condition comprises calculating a checksum of the blocks in the current hierarchical level and comparing the checksum to a previous value, or comparing the date of the block diagram file to the date of the corresponding separate file. Advantageously, the documentation is generated anew if there is an indication that the one or more blocks of the program have been changed with respect to the time when the documentation was initially generated.

The documentation text comprises names of at least some of the one or more blocks of the program; at least one block name is generated by evaluating a naming expression. Naming expression may contain variable sections that change e.g. depending on a higher-level hierarchical block that comprises the current block. Naming expressions comprised in a documentation block are evaluated when the documentation is generated.

In an embodiment of the invention, a graphical representation of the current hierarchical level is generated and included in the documentation, when a predefined visualization tag is present in the current documentation block. Alternatively, a graphical representation of the current hierarchical level may be generated when both a documentation block and a second block of a predefined type, such as a function block, are present in the current hierarchical level.

The technical computing environment comprises a data definition tool, wherein for at least one block, the data type of a variable is defined in the data definition tool, and wherein the defined data type is included in the documentation text. Additionally, the parameters of signals and scaling of variables may be extracted from the data definition tool and included in the documentation text. Further, a variable in the code may be entirely generated from the data definition tool and not be visible in the block diagram; in that case, it is useful to add information from the data definition tool in the documentation text. Advantageously, generating the documentation is carried out after generating the code and thus may use information added to the data definition tool during code generation.

One aspect of the invention also concerns a non-transitory computer readable medium containing instructions that, when executed by a microprocessor of a computer system, cause the computer system to carry out the inventive method as described above or in the appended claims.

In a further aspect of the invention, a computer system is provided which comprises a processor, a random access memory, a graphics controller connected to a display, a serial interface connected to at least one human input device, and a nonvolatile memory, in particular a hard disk or a solid-state disk. The nonvolatile memory comprises instructions that, when executed by the processor, cause the computer system to carry out the inventive method.

The processor may be a general-purpose microprocessor that is customary used as the central processing unit of a personal computer or it may comprise one or a plurality of processing elements adapted for carrying out specific calculations, such as a graphics-processing unit. In alternative embodiments of the invention, the processor may be replaced or complemented by a programmable logic device, such as a field-programmable gate array, which is configured to provide a defined set of operations and/or may comprise an IP core microprocessor.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
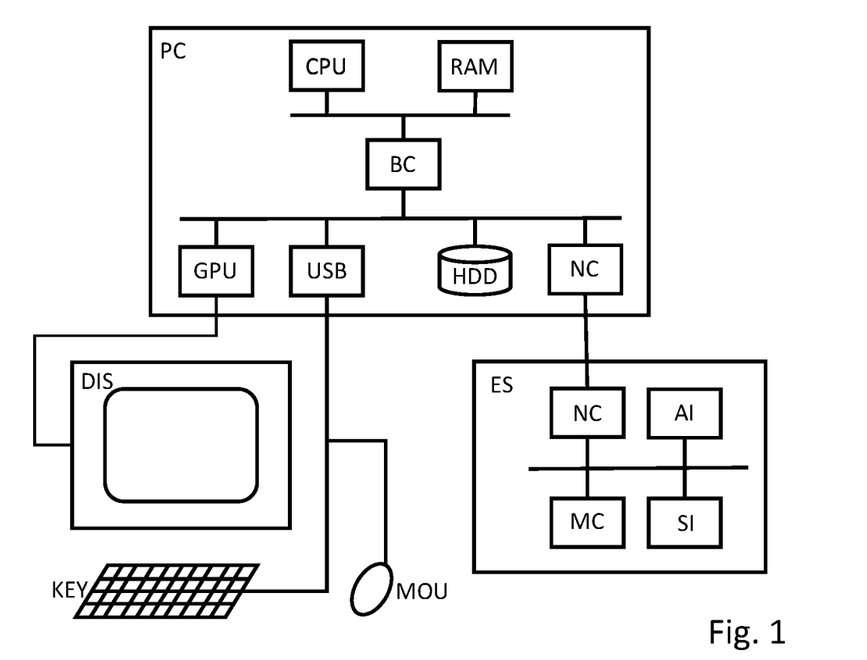
FIG. 1 is an exemplary diagram of a computer system.

FIG. 1 illustrates an exemplary embodiment of a computer system.

The shown embodiment comprises a host computer PC with a display DIS and human interface devices such as a keyboard KEY and a mouse MOU; further, an embedded system ES is depicted, which may e.g. be used for a processor-in-the-loop simulation.

The host computer PC comprises at least one processor CPU with one or multiple cores, a random access memory RAM and a number of devices connected to a local bus (such as peripheral component interconnect—PCI Express), which exchanges data with the CPU via a bus controller BC. The devices comprise e.g. a graphics-processing unit GPU for driving the display, a universal serial bus controller USB for attaching peripherals, a non-volatile memory HDD such as a hard disk or a solid-state disk, and a network interface NC. For example, the non-volatile memory comprises instructions that, when executed by one or more cores of the processor CPU, cause the computer system to carry out a method according to one of the claims.

The embedded system ES comprises a network interface NC, an actuator interface AI and a sensor interface SI as well as a microcontroller MC. As an alternative or addition to the microcontroller MC, the embedded system ES may comprise a programmable logic device such as a field-programmable gate array. The programmable logic device may contain a hardwired digital signal processor and it may be configured to comprise an IP core microprocessor. For example, the embedded system ES is connected to the personal computer PC via the network interface NC, which may e.g. be of USB, RS-232 or Ethernet type. The embedded system may comprise a non-volatile memory that comprises instructions to be carried out by the microcontroller or a configuration to be loaded on the programmable logic device.

In an embodiment of the invention, the host computer may comprise one or more servers comprising one or more processing elements, the servers being connected to a client comprising a display device and an input device via a network. Thus, the technical computing environment may be executed partially or completely on a remote server, such as in a cloud computing setup. A personal computer may be used as a client comprising a display device and an input device via a network. Alternatively, a graphical user interface of the technical computing environment may be displayed on a portable computing device, in particular a portable computing device with a touch screen interface or a virtual reality device.

In an embodiment of the invention, the computer system does not comprise an embedded system ES. While the embedded system ES is useful for carrying out a processor-in-the-loop simulation of a control program, the presence of an embedded system may not be necessary for carrying out the present invention.

Figure 2:
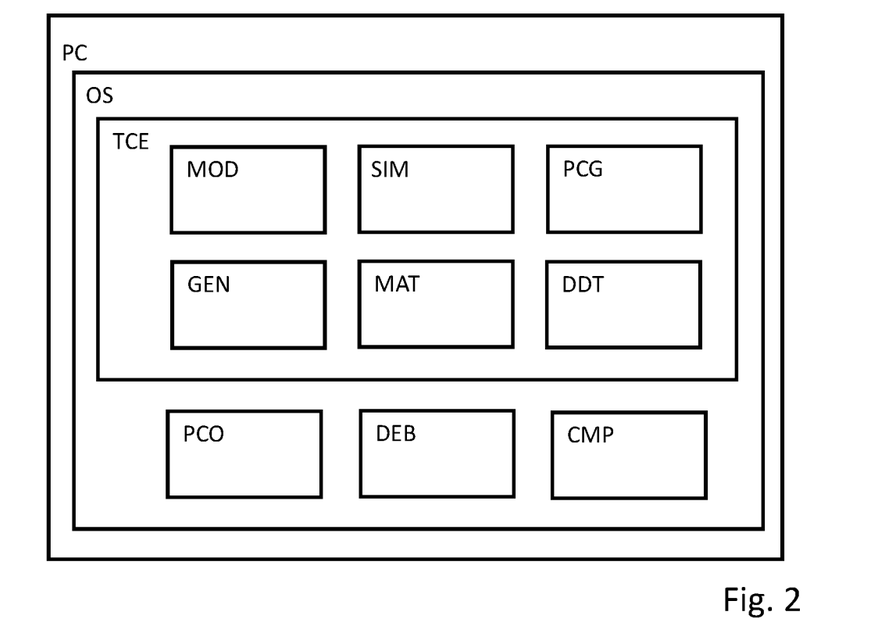
FIG. 2 is an exemplary diagram of software components in a computer system.

FIG. 2 displays an exemplary embodiment of the software components being executed on a computer system, which may be realized as a host computer PC with a standard microprocessor that runs a standard operating system OS such as Microsoft Windows or a Linux distribution.

On the host computer PC, a technical computing environment TCE such as MATLAB/Simulink of The Mathworks may be installed. Other examples of technical computing environments comprise Labview of National Instruments or the Advanced Simulation/Software and Control Engineering Tool (ASCET) of ETAS. The technical computing environment TCE comprises a plurality of software components such as a modelling environment MOD and a simulation engine SIM. Additionally, the TCE may comprise a mathematical and/or script interpreter MAT that is adapted for carrying out calculations or modifying data. The TCE comprises a production code generator PCG that is adapted to produce production code from a model; further, it comprises a documentation generator and it may comprise a data definition tool DDT. The expression that a software component is comprised in the TCE is intended to encompass the case that the software component uses a specific mechanism of the TCE such as an application-programming interface of the TCE in order to exchange data and/or instructions with other software components in the TCE. For example, a software component may be realized as or comprise an add-on such as a toolbox for the modelling environment.

The modelling environment MOD may provide a graphical user interface for creating and modifying block diagrams that describe the temporal behavior of a dynamic system. Additionally, blocks adapted for describing finite states and conditions for transitions between states may be used to model the dynamic system. A block may describe an atomic operation, such as an arithmetic calculation or a logic expression, or it may represent a subsystem that is described in more detail by an additional or partial block diagram in a subordinate hierarchical level. This need not imply that the partial block diagram is stored in a separate file, but rather that the functionality of a hierarchical block is defined by a plurality of blocks in a subordinate level. Alternatively, it may contain code in a higher-level programming language, in particular a dynamic language intended for mathematical programming, that realizes the block's functionality. Multiple blocks may be connected by signals for the exchange of data. For example, an initial block may receive a signal of type single as input signal, may modify the signal e.g. by adding a constant and may send an output signal of type double to a further block. It may be said that the further block is downstream of the initial block because they are connected by a signal path so that data flows from the initial block to the further block.

The simulation engine SIM may be adapted to execute a block diagram created in the modelling environment MOD in order to observe the temporal behavior of the dynamic system described by the block diagram. The execution of a block diagram may also be called a model-in-the-loop simulation of the dynamic system and is preferably carried out using high-precision operations in order to observe the behavior more closely and to create reference data.

The production code generator PCG allows for creating production code from one or more blocks in a block diagram. Production code may be optimized for readability, traceability, safety, low-energy consumption, execution speed and/or memory requirements. Preferably, the code generator provides a user interface for setting a plurality of options for adapting the customization of the generated code. Customization options may include target-specific optimizations for the microcontroller of the embedded system and enforcing compliance of the generated code to a specific standard, such as the Motor Industry Software Reliability Association (MISRA) C guidelines. An example production code generator PCG is TargetLink of dSPACE.

The data definition tool DDT provides a local or remote database for storing definitions and parameters as well as an application-programming interface for automatic exchange of the data between different software components. The term "database" is to be understood preferably in a broad sense, so that a file with a tree structure may be considered a local database. A data definition tool allows for a clean separation of the model of the dynamic system given in the block diagram from implementation-specific details stored in the database. When a complex model is structured in different sub-models, data in different sub-models may be linked. By storing corresponding information in the data definition tool, these dependencies may be automatically resolved. Additionally, by exchanging data with a software architecture tool, such as SystemDesk of dSPACE, the data definition tool DDT can be used as part of a higher-level tool chain, in particular to generate product code compliant to the AUTOSAR standard. An example data definition tool is TargetLink Data Dictionary of dSPACE.

The documentation generator GEN is adapted to traverse the block diagram and generate a documentation based on the definitions in the documentation blocks. The documentation may comprise information from the data definition tool DDT and/or data from external data sources.

Other software components such as a production code compiler PCO, a debugger DEB or a comparison tool CMP may also be installed on the computer. These software components may be interfaced to each other and/or the technical computing environment using standard mechanisms of the underlying operating system OS. The compiler COM may generate an executable for the microprocessor of the PC or it may generate an object code for the microcontroller of the embedded system. Additionally, it may be configured to generate additional debugging information and to include it in the executable. In this way, the debugger DEB can e.g. be used for observing the value of a signal during a software-in-the-loop simulation of the generated production code. Depending on the intended use, the observed values may be directly displayed to the user and/or they may be logged in a memory, e.g. in RAM, in a file or a database.

Figure 3:
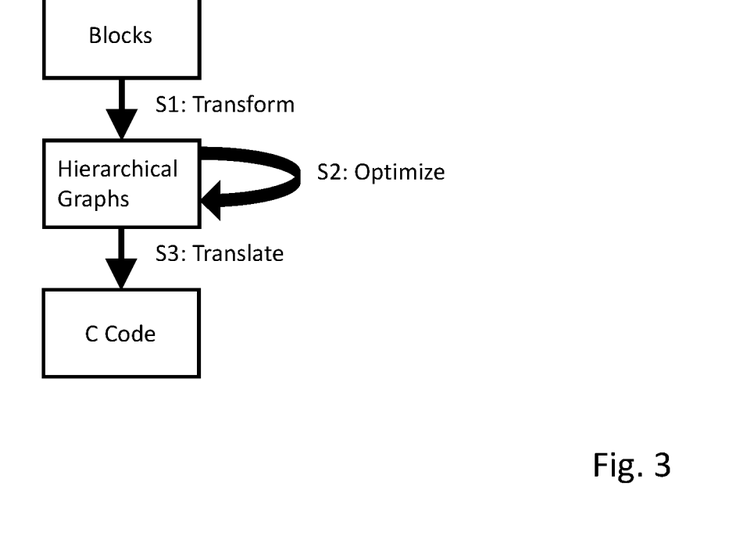
FIG. 3 is an exemplary diagram of a method for generating production code from a block diagram.

FIG. 3 illustrates an exemplary embodiment of the generation of production code from one or more blocks in a block diagram. The following steps are carried out, for example, by a microprocessor on the host computer; alternatively, a client server setup may be used so that computationally expensive steps are carried on a remote server containing a plurality of microprocessors.

In a first step S1, the selected one or more blocks (or, if selected, the entire block diagram) and related input data are transformed to an intermediate representation such as one or more hierarchical graphs. These hierarchical graphs may in particular comprise a data flow graph, a control flow graph and/or a tree structure. Related input data may e.g. be extracted from a database associated with the block diagram. This may encompass situations where elements of the block diagram are created based on information from a data definition tool, or where settings relevant for the production code generation are retrieved from the data definition tool.

In a second step S2, the hierarchical graphs are optimized in order to reduce the number of variables required and/or the number of operations or instructions to be carried out. This optimization may comprise a plurality of intermediate steps on further intermediate representations between block level and production code level. In each step, an initial set of hierarchical graphs or an intermediate language is converted to a modified set of hierarchical graphs or an intermediate language while applying one or more optimization rules. A number of strategies such as constant folding or elimination of dead code may be applied during optimization.

In a third step S3, the optimized intermediate representations such as optimized hierarchical graphs are translated to code in a high-level or low-level programming language, for example, C code. The code may be further optimized in this step and restricted to a subset of the linear or parallel programming language, the control and dataflow structures may be restricted to precisely specified variants, the scope of functions and data may be restricted according to accurately specified rules. Alternatively or in addition, additional information may be added to the code, e.g. in the form of comments, to enhance readability or help in debugging the code.

During or after the code generation, information on the current block diagram or the code generation, especially results of the code generation, may again be stored in a database such as the data definition tool. This information may e.g. be used to initialize the simulation engine, to influence a compilation process with a production code compiler, or to export production code information for use in other tools/process, like e.g. calibration and measurement information in ASAP2 format (Association for Standardization of Automation and Measuring Systems—ASAM—measurement and calibration data exchange abbreviated as ASAP2) or AUTOSAR XML information (Automotive Open System Architecture Extensible Markup Language abbreviated AUTOSAR XML).

Preferably, the documentation is generated automatically after production code generation has been finished.

In an embodiment, hardware-level code or a configuration for a programmable hardware device may be created from the blocks describing the control program.

Figure 4:
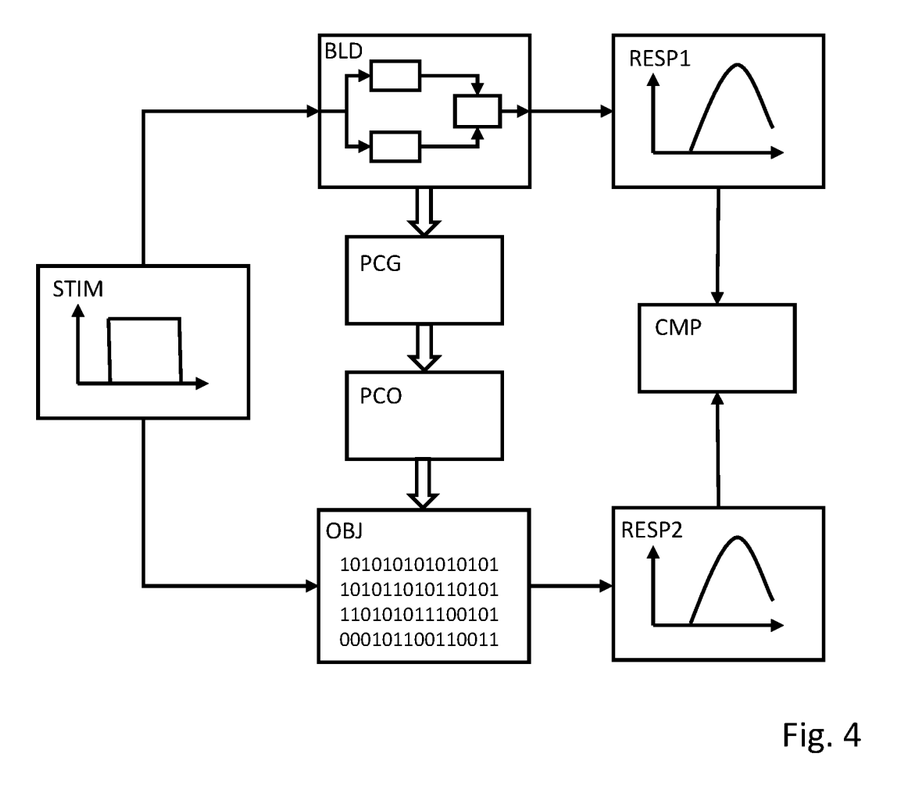
FIG. 4 is an exemplary diagram of a method for testing the compliance of the executable with a model specifying the desired behavior.

FIG. 4 displays an exemplary embodiment of a method for compiling and testing a control program.

The modelling environment MOD of the TCE preferably comprises a graphical user interface for modifying a block diagram BLD, which may comprise a plurality of blocks interconnected by signal paths. Each block may be an atomic block providing a specific functionality or it may represent a hierarchical block such as a subsystem, which comprise a plurality of subordinate blocks that are shown in a lower hierarchical level. Blocks may be connected by signals which may be of scalar or composite type and which can be represented by arrows indication the direction of the data flow. In the shown example, the block diagram comprises three blocks, an input port for receiving an input signal and an output port for sending an output signal. Preferably, the block diagram describes the predetermined or intended behavior of a control program. Upon activation of the simulation engine in the technical computing environment, the block diagram BLD is executed and results are calculated for each time step. The block diagram may be interpreted directly or it may be converted to an intermediate form that allows for a faster execution in the simulation engine.

Preferably, a number of test cases for the control program have been deduced from the specification and intended application of the control program. Advantageously, a test case comprises a stimulus STIM sent as an input signal to the control program and a corresponding response RESP received as an output signal from the control program. In the shown example, the stimulus STIM is represented by a diagram depicted a particular temporal behavior of the input signal. When the control program is executed in the simulation engine on the host computer, operations corresponding to the block diagram BLD are carried out for a plurality of time steps. During each time step, the current value of the stimulus STIM is fed to the appropriate input ports of the block diagram, the block diagram BLD is being executed in the simulation engine, so that signals are being manipulated and a new internal state of the model may be reached. By simulating the model given in the block diagram for a predetermined duration and by recording the output signal, a response RESP1 can be determined in a model-in-the-loop simulation. A model-in-the-loop simulation mode may be used for verifying that the block diagram executed in the simulation engine actually describes the intended behavior of the control program. All arithmetic calculations can be carried out with high-precision operations, e.g. using the floating-point data type double for the variables. As a result, the simulation is sufficiently accurate to use the recorded output signals as reference data.

Once correctness of the model has been established and reference data has been stored, the blocks corresponding to the control program are converted to program code via the production code generator PCG. The generated production code is then compiled to object code or an executable using the production code compiler PCO; an object code is binary data that contains instructions for a particular processor. When the object code is combined with additional information for the operating system of the host computer, an executable for the host computer is formed. Settings applied during the code generation may comprise a conversion to lower-precision operations that are computationally more efficient, e.g. integer instructions for fixed-point calculations, so that the control program later can be executed in real-time on the microcontroller of an embedded system.

In order to verify that the calculations of the generated code are sufficiently accurate and match the behavior of the blocks in the graphical model, a software-in-the-loop simulation or a processor-in-the-loop simulation may be carried out. The object code or the executable OBJ, which may be in the form of a DLL, contains calculations corresponding to the block diagram. During a predetermined duration, a stimulus STIM is fed to the object code or executable OBJ, and the output signals are recorded to obtain a response RESP2.

The response RESP1 of the model-in-the-loop simulation may be displayed on the host computer simultaneously with the response RESP2 of the generated code, so that a visual comparison may be performed by the user. Additionally or alternatively, the response RESP1 and RESP2 may be compared in a comparison tool CMP, so that a number of checks for compliance to predetermined conditions may be carried out. Preferably, the output signals are compared point by point; in particular, the absolute difference between a data point in RESP1 and the corresponding data point in RESP2 may be calculated. By comparing the differences to a threshold indicating a maximum permissible difference, the correctness of the optimizations applied when generating and compiling the code can be verified.

The reference data and/or the response of the production code may be included partially or completely in the generated documentation.

Figure 5:
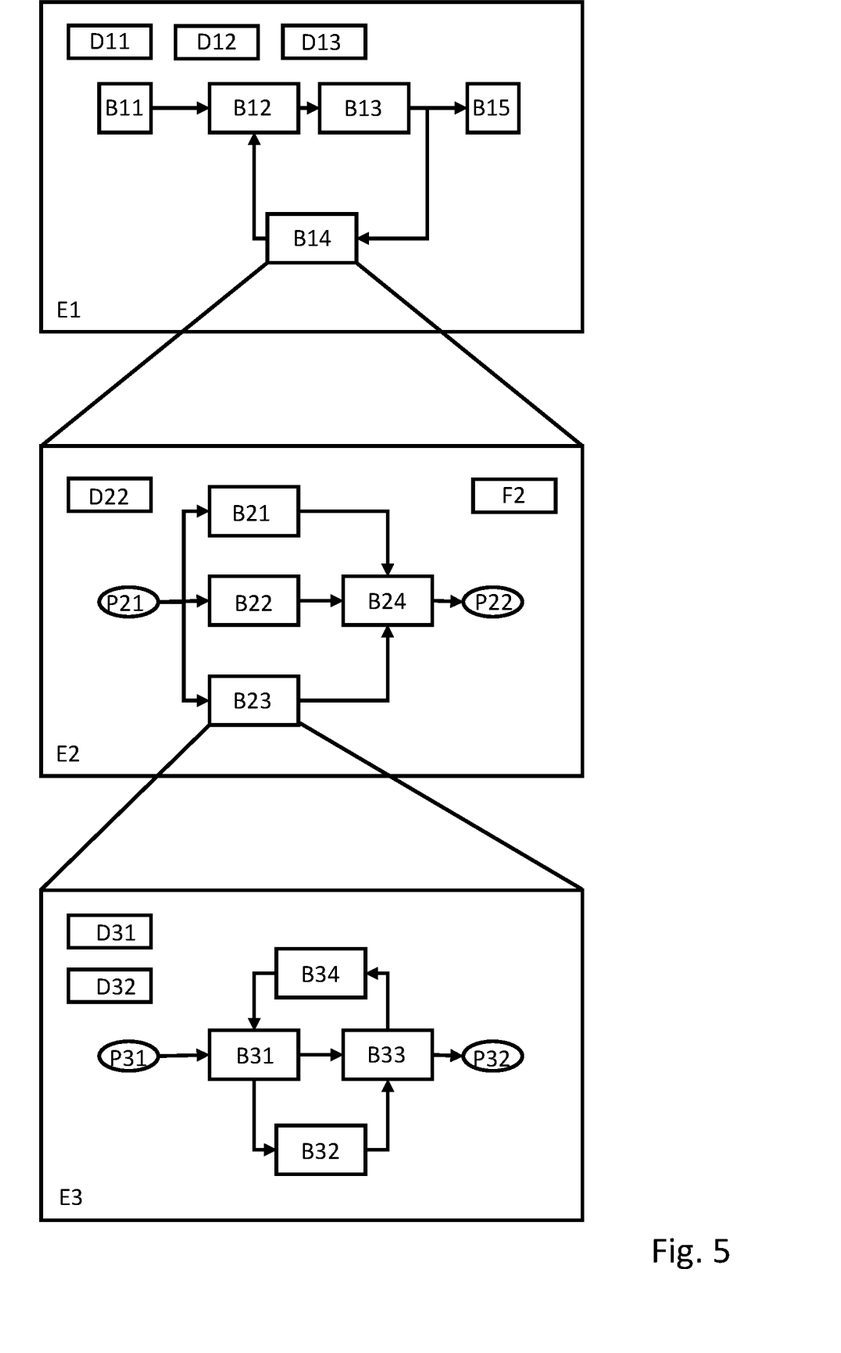
FIG. 5 is a schematic view of an exemplary block diagram containing documentation blocks.

FIG. 5 displays a schematic view of an exemplary block diagram containing documentation blocks. A rectangular box surrounds blocks of one hierarchical level.

The exemplary block diagram comprises a plurality of blocks B1$i$, $i$=1 . . . 5, in the top hierarchical level E1. The blocks are connected by signals, wherein a signal has a predefined data type and the direction of the signal flow is indicated by arrows. In the top hierarchical level, three documentation blocks D11, D12 and D13 are present. In each documentation block, one or more tags may be defined; for simplicity it is assumed that a first tag is defined in documentation block D11, a second tag is defined in documentation block D12 and a third tag is defined in documentation block D13. Each documentation block contains fixed portions of documentation text and/or predefined rules for generating documentation text. Further, the documentation blocks may contain links for retrieving additional data and/or including image files in the documentation. The blocks B11, B12 B13 and B15 may be atomic blocks; they may alternatively be hierarchical blocks whose subordinate levels are not shown in the schematic view. Block B14 is a hierarchical block, whose functionality is defined by a plurality of blocks in a subordinate hierarchical level E2.

The second hierarchical level E2 comprises a plurality of blocks B2j, j=1 . . . 4, a documentation block D22, an input port P21 and an output port P22. Further, a function block F2 is present in the current hierarchical level, i.e. the current subsystem. The function block indicates that the production code for the blocks in the current hierarchical level E2 is to be generated enclosed by a function call. In principle, the function defined by the function block F2 may be called multiple times in the program generated from the block diagram. For simplicity, it is assumed that only a second tag is defined in documentation block D22. The blocks B21, B22 and B24 may be atomic or may comprise a subordinate hierarchical level in which the functionality of the respective block is defined; for simplicity, any possible subordinate hierarchical level to those blocks is not shown. Block B23 is a hierarchical block whose functionality is defined in a subordinate hierarchical level E3.

The third hierarchical level E3 comprises a plurality of blocks B3k, k=1 . . . 4, two documentation blocks D31, D32, an input port P31 and an output port P32. For simplicity, it is assumed that a first tag is defined in documentation block D31 and a second tag is defined in documentation block D32. The blocks B31, B32, B33 and B34 may be atomic or they may comprise subordinate hierarchical level. Generally, block diagrams may comprise an arbitrary number of hierarchical levels; in the current example, no further hierarchical levels are shown.

Figure 6:
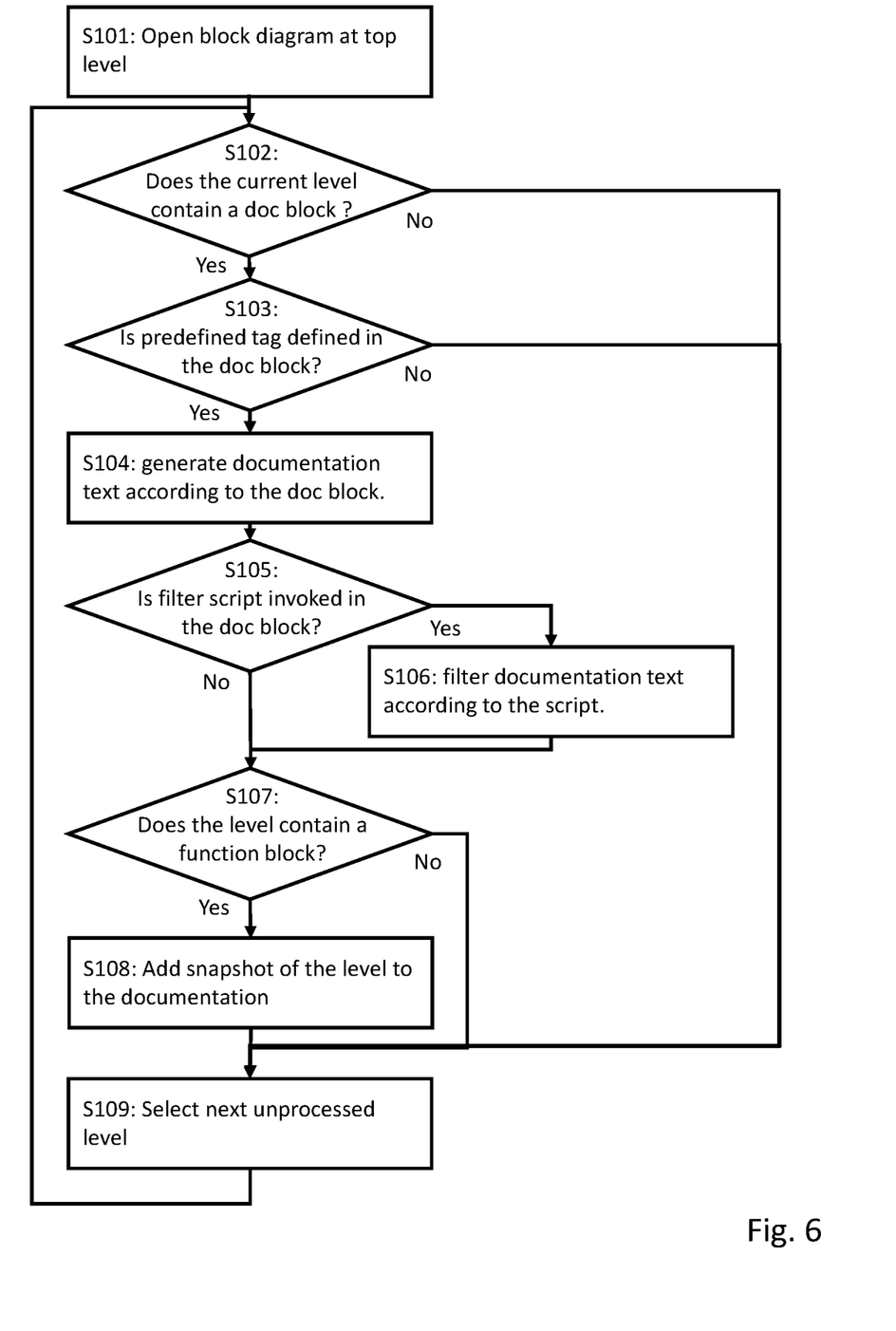
FIG. 6 is a schematic of an embodiment of a method for generating documentation according to the invention.

FIG. 6 displays a schematic diagram of an embodiment of the inventive method, the method being carried out by a processor of a host computer.

In step S101, the processor opens the selected block diagram at the top hierarchical level. Opening the block diagram may involve accessing files located on a server computer connected to the host computer.

In step S102, the processor verifies if the current hierarchical level comprises a documentation block (doc block). In case no documentation block is present, the processor switches to step S109 below.

When a documentation block is present in the current level, the processor verifies in step S103 if a predefined tag is set in the documentation block. Should the current hierarchical level comprise more than one documentation block, the processor verifies for each documentation block if the conditions are fulfilled; when this is the case, the processor generates in step S104 the corresponding documentation text for each block according to the fulfilled conditions. This may also involve generating whole or partial graphical representations of the current hierarchical level. For simplicity, repeating the steps S103 to S107 for each documentation block in the current level is not shown in the schematic diagram.

For a documentation block in which the predefined tag is set, the processor verifies in step S105 if a filter script is invoked in or after execution of the documentation block. When this is the case, the filter script is executed by the processor in step S106 and the documentation text is filtered according to the filter script.

In step S107, the processor verifies if a function block, i.e. a block defining a function in the generated code, is present in the current hierarchical level. When this is the case, a graphical representation (snapshot) of the blocks in the current hierarchical level is added to the documentation in step S108. Further, additional text may be included in the documentation when a function block is present.

In step S109, the processor selects the next unprocessed hierarchical level and continues at step S102 by verifying if a documentation block is present. Selecting the next unprocessed level may comprise ascending and descending intermediate hierarchical levels that have been processed before. Further, a change in the hierarchical level may comprise adding a new section in the documentation. Additionally, a table of contents may be generated based on the different sections.

When more than one predefined tag is defined, i.e. multiple versions of the documentation are to be generated, the steps shown in the schematic diagram are repeated for each predefined tag. Referring to FIG. 5, where three different tags are defined in documentation blocks of the diagram, the processor will carry out the steps of the inventive method once for the first tag, once for the second tag and once for the third tag.

When generating documentation for the first tag, the processor starts at the top hierarchical level E1 and verifies that the first tag is defined in documentation block D11. Thus, documentation text for level E1 is generated according to documentation block D11. Because no function block is present in level E1, the processor does not add a snapshot. For simplicity, it is assumed that no filter scripts are invoked in any of the documentation block in FIG. 5, so that the documentation text is not filtered. After generating the documentation for level E1, the processor descends to the second hierarchical level E2. Because no documentation block in this level defines the first tag, the processor descends to the next hierarchical level without generating any documentation text. In the third hierarchical level, the first tag is set in documentation block D31. Thus, the processor generates documentation text for the blocks in this hierarchical level. Then the processor selects the next unprocessed level. Assuming that all blocks without shown subordinate level are atomic blocks without substructure, no further levels are present in the block diagram. As a result, documentation generation for the first tag is complete.

When generating documentation for the second tag, the processor starts at the top hierarchical level E1 and verifies that the second tag is defined in documentation block D12. Thus, documentation text for level E1 is generated according to documentation block D12. Because no function block is present in level E1, the processor does not add a snapshot. Then the processor descends to the second hierarchical level E2 and verifies that the second tag is set in documentation block D22. Therefore, documentation text for the current level is generated according to documentation block D22. The processor determines that function block F2 is present in the second hierarchical level and creates a graphical representation of the blocks in the current hierarchical level to the documentation. Depending on user settings, a graphical representation of a current hierarchical level may or may not comprise blocks in a subordinate hierarchical level. Subsequently, the processor selects the next hierarchical level E3. The processor determines that the second tag is set in documentation block D32 and generates documentation text for the third hierarchical level. Thus, the documentation generated for the second tag comprises information on the first, second and the third hierarchical level, wherein the order of the documentation depends on the hierarchical level of the corresponding blocks.

Because the third defined tag is set only in documentation block D13, only information on the top hierarchical level E1 is included in the documentation for the third tag.

Figure 7:
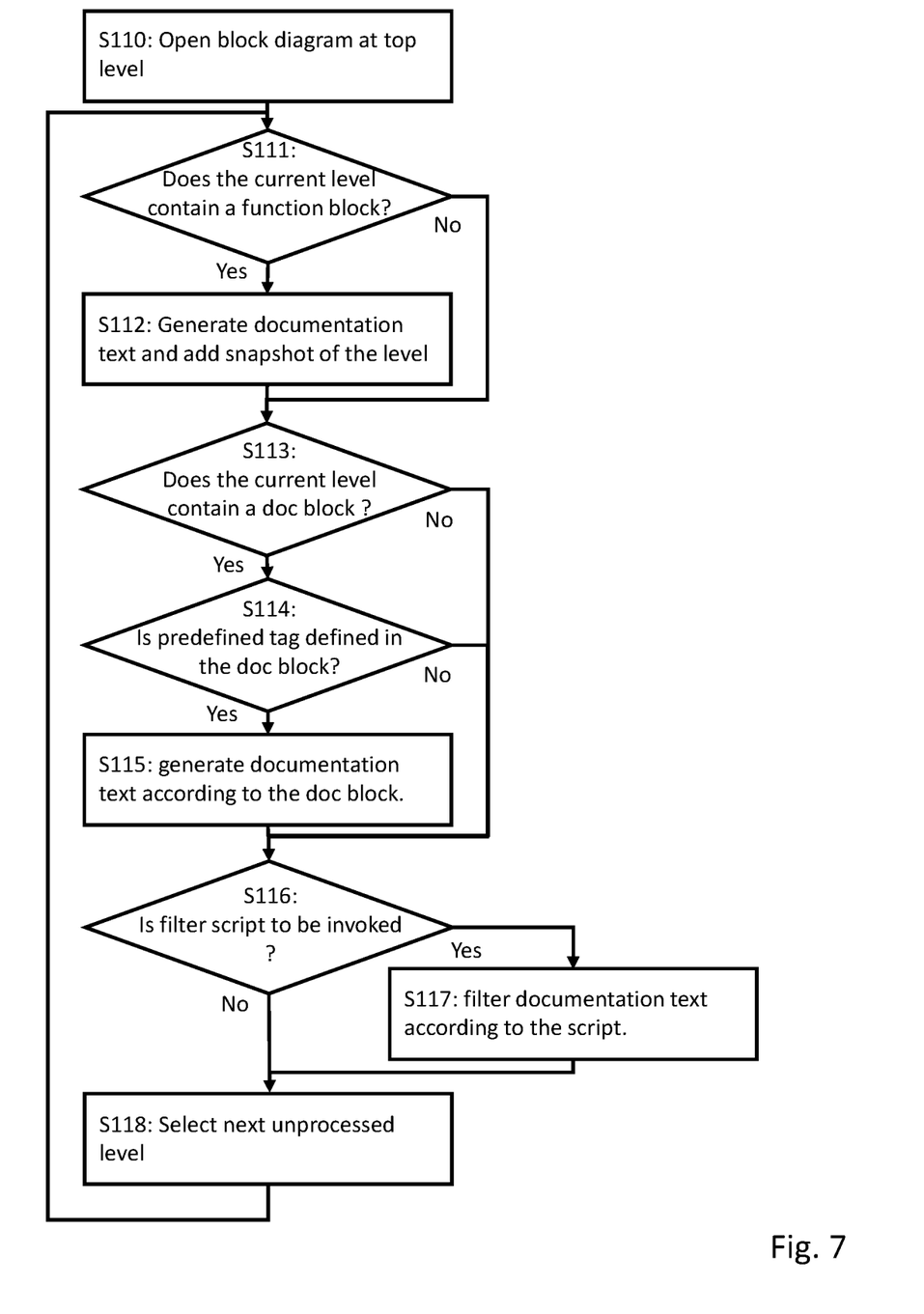
FIG. 7 is a schematic of an embodiment of a method for generating documentation according to the invention.

FIG. 7 displays a schematic diagram of an embodiment of the inventive method, the method being carried out by a processor of a host computer.

In step S110, the processor opens the selected block diagram at the top hierarchical level. Opening the block diagram may involve accessing files located on a server computer connected to the host computer.

In step S111, the processor verifies if a function block, i.e. a block defining a function in the generated code, is present in the current hierarchical level. When this is the case, a documentation is generated for the current hierarchical level is generated and a graphical representation (snapshot) of the blocks in the current hierarchical level is added to the documentation in step S112. For the top hierarchical level, the presence of a function block may be assumed, so that a documentation text is always generated.

In step S113, the processor verifies if the current hierarchical level comprises a documentation block (doc block). In case no documentation block is present, the processor switches to step S116 below.

When a documentation block is present in the current level, the processor verifies in step S114 if a predefined tag is set in the documentation block. Should the current hierarchical level comprise more than one documentation block, the processor verifies for each documentation block if the conditions are fulfilled; when this is the case, the processor generates in step S115 the corresponding documentation text for each block according to the fulfilled conditions. This may also involve generating whole or partial graphical representations of the current hierarchical level. For simplicity, repeating the steps S114 and S115 for each documentation block in the current level is not shown in the schematic diagram.

Having generated the documentation text corresponding to the function block and/or a documentation block, the processor verifies in step S116 if a filter script is to be invoked. When this is the case, the filter script is executed by the processor in step S117 and the documentation text is filtered according to the filter script. Generally, filter scripts may be invoked at different steps during execution of the method.

In step S118, the processor selects the next unprocessed hierarchical level and continues at step S111 by verifying if a function block is present. Selecting the next unprocessed level may comprise ascending and descending intermediate hierarchical levels that have been processed before.

When the documentation text has been fully generated, the processor preferably exports the documentation in a file. The file may have different formats such as PDF or HTML; instead of one file, multiple linked files may be generated.

Referring to the block diagram in FIG. 5, the inventive method will be carried out for each of three predefined tags. For the first tag, the processor generates a documentation text for the top hierarchical level E1 as well as a snapshot of the blocks. Because the first tag is defined in D11, the processor generates custom text based on this documentation block. Due to the function block in E2, the processor generates documentation text and a snapshot of the blocks in the second hierarchical level. For lack of a function block, only custom documentation text based on D31 is generated for the third hierarchical level E3. As to the second tag, the processor also generates a documentation text for the top hierarchical level E1 as well as a snapshot of the blocks. Because the second tag is defined in D12, the processor generates custom text based on this documentation block. For the second hierarchical level E2, the processor generates documentation text and a snapshot of the block due to the function block. Further, custom documentation is generated according to documentation block D22. Only custom documentation based on D32 is generated for E3. Concerning the third tag, the processor generates a documentation text as well as a snapshot for the top hierarchical level E1. Custom documentation according to documentation block D13 is added. For E2, the processor generated documentation as well as a snapshot of the blocks in the second hierarchical level, but no custom documentation. Because neither a function block nor a documentation block with the third predefined tag is present in E3, no documentation is generated for this level.

In an embodiment of the inventive method, shown in FIG. 6, documentation text was only generated when a documentation block with a predefined tag was present in the current hierarchical level. In contrast, the other embodiment shows that a general documentation text may be generated independent of the presence of documentation blocks. As a result, variants of the inventive method allows for finely adapting the generated documentation.

Those skilled in the art will appreciate that the order of at least some of the steps of the inventive method may be changed without departing from the scope of the claimed invention. While the present invention has been described with respect to a limited number of embodiments, those skilled in the art will appreciate numerous modifications and variations therefrom. It is intended that the appended claims cover all such modifications and variations as fall within the true spirit and scope of the present invention.

What is claimed is:

1. A method for generating a documentation of a program, the program being generated from a block diagram in a technical computing environment, the method being carried out by a computer system comprising at least one processor, the method comprising:

opening the block diagram at a top hierarchical level in a model editor of the technical computing environment, the block diagram comprising one or more blocks interconnected by one or more signal paths indicating directions of data flows and arranged in one or more hierarchical levels, each block being an atomic block that provides a specific functionality or a hierarchical block whose functionality is defined by a plurality of blocks in a subordinate hierarchical level of the block diagram, the top hierarchical level comprising at least one top hierarchical block;

verifying if a documentation condition is fulfilled for the top hierarchical level of the block diagram;

generating, when the documentation condition is fulfilled, a documentation text for the one or more blocks in the top hierarchical level;

descending to a subordinate hierarchical level and verifying if the documentation condition is fulfilled for the subordinate hierarchical level; and generating documentation text for the blocks in the subordinate hierarchical level when the documentation condition is fulfilled, wherein at each hierarchical level of the block diagram, the documentation condition is fulfilled for that hierarchical level when that hierarchical level includes at least one documentation block and when at least one tag is defined in the at least one documentation block.

2. The method of claim 1, wherein when a hierarchical level includes two or more documentation blocks, and a first tag or a second tag are defined in the two or more documentation blocks, a first documentation text is generated based on at least one documentation block of the hierarchical level in which the first tag is defined and a second documentation text is generated based on at least one documentation block of the hierarchical level in which the second tag is defined.

3. The method of claim 1, wherein the block diagram has one or more subordinate hierarchical levels, and
  wherein the steps of descending to a subordinate hierarchical level and verifying if a documentation condition is fulfilled and generating the documentation text are repeated until all hierarchical levels in the block diagram have been considered.

4. The method of claim 1, wherein the one or more blocks corresponding to the program have at least one input and at least one output, and wherein the block diagram comprises one or more additional blocks, which are connected to a model via corresponding outputs and inputs,
  wherein the one or more additional blocks describes a temporal behavior of a dynamical system to be controlled by the program, and
  wherein no text is generated for the one or more additional blocks.

5. The method of claim 1, further comprising:
  simulating the block diagram in a simulation engine of the technical computing environment;
  logging or extracting the values of one or more variables of one or more blocks of the program; and
  including the logged or the extracted values in the documentation text.

6. The method of claim 1, further comprising invoking a filter script, wherein the filter script removes, replaces or adds text based on a predefined filter rule.

7. The method of claim 1, wherein additional documentation text is generated for those hierarchical levels that comprise a block of a specific type,
  wherein the documentation text for those hierarchical levels is stored in a separate file,
  wherein the documentation for the program is assembled from multiple separate files, and
  wherein, if a separate file for a particular hierarchical level is present, the content of the separate file is used in creating the documentation.

8. The method of claim 7, wherein the documentation text for the particular hierarchical level is regenerated when an update condition is fulfilled, and
  wherein the update condition comprises calculating a checksum of the blocks in the particular hierarchical level and comparing the checksum to a previous value or comparing a date of the block diagram file to a date of the separate file corresponding to the block diagram file.

9. The method of claim 1, wherein the documentation text comprises names of at least some of the blocks, and
  wherein at least one block name is generated by evaluating a naming expression.

10. The method of claim 1, wherein a graphical representation of a hierarchical level is generated and included in the documentation text, when a predefined visualization tag is present in a documentation block of the hierarchical level.

11. The method of claim 1, wherein the technical computing environment comprises a data definition tool,
  wherein, for at least one block, a data type of a variable is defined in the data definition tool, and
  wherein the defined data type is included in the documentation text.

12. A non-transitory computer readable medium containing instructions that, when executed by a microprocessor of a computer system, cause the computer system to carry out the method according to claim 1.

13. A computer system comprising:
  a microprocessor;
  a random access memory;
  a graphics controller connected to a display;
  a serial interface connected to at least one human input device; and
  a nonvolatile memory, a hard disk, or solid state disk, that comprises instructions configured to be executed by the microprocessor, and cause the computer system to carry out the method according to claim 1.

14. A method for generating a documentation of a program, the method being carried out by a computer system, the method comprising:
  opening a block diagram comprising a plurality of blocks interconnected by one or more signal paths indicating directions of data flows and arranged in a plurality of hierarchical levels, each of the plurality of blocks being an atomic block that provides a specific functionality or a hierarchical block whose functionality is defined by a lower hierarchical level of the block diagram, each hierarchical level including one or more blocks of the plurality of blocks; and
  generating a documentation text corresponding to a tag, said generating comprising:
    at each hierarchical level, verifying whether the corresponding tag is defined in at least one documentation block of that hierarchical level; and
    at each hierarchical level, when it is verified that a corresponding tag is defined in the at least one documentation block, generating the documentation text for that hierarchical level based on the at least one documentation block, and wherein the at least one documentation block comprises:
      a fixed text portion,
      a predefined rule for generating text,
      a link for retrieving at least one of additional data and
      a link for retrieving image files,
    wherein when a top hierarchical level of the plurality of hierarchical levels includes one or more documentation blocks defining multiple tags, multiple versions of the documentation text are generated corresponding to the multiple tags.

15. The method according to claim 14, wherein generating the documentation text further comprises:
  at each hierarchical level, filtering the documentation text of that hierarchical level according to a filter script when the at least one documentation block invokes the filter script, and
  wherein the filter script does at least one of the following: removes, replaces and adds text based on one or more predefined filter rules.

16. A method for generating a documentation of a program, the method being carried out by a computer system, the method comprising:
  opening a block diagram comprising a plurality of blocks interconnected by one or more signal paths indicating directions of data flows and arranged in a plurality of hierarchical levels, each of the plurality of blocks being an atomic block that provides a specific functionality or a hierarchical block whose functionality is defined by a lower hierarchical level of the block diagram, each hierarchical level including one or more blocks of the plurality of blocks; and
  generating a documentation text corresponding to a tag, said generating comprising:
    at each hierarchical level, verifying whether the corresponding tag is defined in at least one documentation block of that hierarchical level; and
    at each hierarchical level, when it is verified that a corresponding tag is defined in the at least one documentation block, generating the documentation text for that hierarchical level based on the at least one documentation block, and wherein the at least one documentation block comprises:
  a fixed text portion,
  a predefined rule for generating text,
  a link for retrieving at least one of additional data and a link for retrieving image files,
wherein generating the documentation text further comprises:
at each hierarchical level, adding a graphical representation of the one or more blocks of that hierarchical level to the documentation text when at least one of the following occurs:
  the at least one documentation block includes a predefined visualization tag, and
  that hierarchical level includes a function block defining a function generated from the block diagram in a technical computing environment.

17. A method for generating a documentation of a program, the method being carried out by a computer system, the method comprising:
  opening a block diagram comprising a plurality of blocks interconnected by one or more signal paths indicating directions of data flows and arranged in a plurality of hierarchical levels, each of the plurality of blocks being an atomic block that provides a specific functionality or a hierarchical block whose functionality is defined by a lower hierarchical level of the plurality of hierarchical levels of the block diagram, each of the plurality of hierarchical levels including one or more blocks of the plurality of blocks; and
  at each of the plurality of hierarchical levels, generating a documentation text corresponding to a tag of that hierarchical level and adding a graphical representation of the one or more blocks of that hierarchical level to the documentation text when that hierarchical level includes at least one of the following:
    the at least one documentation block has a predefined visualization tag, and
    a function block defining a function generated from the block diagram in a technical computing environment.

18. The method according to claim 17, wherein a documentation text of a top hierarchical level of the plurality of hierarchical levels and the graphical representation of the one or more blocks of the top hierarchical level are always generated.

19. The method according to claim 17, wherein the method further comprises:
  at each of the plurality of hierarchical levels, verifying whether a tag is defined in at least one document block of that hierarchical level; and
  at each of the plurality of hierarchical levels, when it is verified that the tag is defined in the at least one documentation block, adding a custom text for that hierarchical level to the documentation text based on the at least one documentation block,
wherein the at least one documentation block comprises:
  a fixed text portion,
  a predefined rule for generating text,
  a link for retrieving additional data, or
  a link for retrieving image files.

20. The method according to claim 17, wherein generating the documentation text further comprises:
  at each hierarchical level, filtering the documentation text of that hierarchical level according to a filter script when the at least one documentation block invokes the filter script, and
  wherein the filter script does at least one of the following: removes, replaces and adds text based on one or more predefined filter rules.

* * * * *